(12) United States Patent
Nakatani et al.

(10) Patent No.: US 7,271,708 B2
(45) Date of Patent: Sep. 18, 2007

(54) SYSTEM INFORMING A STATE OF A WHEEL ASSEMBLY OF A VEHICLE AND A METHOD FOR INFORMING THE SAME

(75) Inventors: Koji Nakatani, Kanagawa (JP); Toshimitsu Ebinuma, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 170 days.

(21) Appl. No.: 11/124,351

(22) Filed: May 9, 2005

(65) Prior Publication Data
US 2006/0016110 A1    Jan. 26, 2006

(30) Foreign Application Priority Data
May 10, 2004    (JP)    ............................. 2004-140157

(51) Int. Cl.
B60C 23/00    (2006.01)
B60C 23/02    (2006.01)

(52) U.S. Cl. ...................... 340/442; 73/146.3

(58) Field of Classification Search ............... 340/442, 340/443; 116/34 R; 73/146, 146.3, 146.4, 73/146.8
See application file for complete search history.

(56) References Cited

U.S. PATENT DOCUMENTS 4,723,445 A * 2/1988 Ripley et al. ............... 73/146.3
4,896,531 A * 1/1990 Hayes .......................... 73/146
5,819,779 A * 10/1998 Takemura et al. .......... 73/146.8
5,838,229 A    11/1998 Robinson, III
6,911,903 B2 * 6/2005 Gladstone et al. .......... 340/442
6,948,359 B2 * 9/2005 Proschka .................... 73/146.5
6,978,669 B2 * 12/2005 Lionetti et al. ............. 73/146.4

FOREIGN PATENT DOCUMENTS

JP    08-505939    6/1996
JP    10-104103    4/1998

* cited by examiner

*Primary Examiner*—John Tweel, Jr.
(74) *Attorney, Agent, or Firm*—Finnegan, Henderson, Farabow, Garrett & Dunner, L.L.P.

(57) ABSTRACT

Wheel assembly identification indicating members and first communication devices are respectively mounted to wheel assemblies mounted to a vehicle body. The indicating members have characteristic appearances, which are different among the wheel assemblies and which make the respective wheel assemblies identifiable in external appearance. The first communication devices transmit by wireless transmission pieces of wheel assembly information on the respective wheel assemblies as well as pieces of identification information held by the respective first communication devices. A second communication device provide on the vehicle body side receives the pieces of wheel assembly information and the pieces of identification information and specifies the respective wheel assemblies from which the pieces of wheel assembly information are transmitted, by referring to a correlation between prestored piece of information on characteristic appearances of the indicating members and the pieces of identification information.

10 Claims, 3 Drawing Sheets

SYSTEM INFORMING A STATE OF A WHEEL ASSEMBLY OF A VEHICLE AND A METHOD FOR INFORMING THE SAME

BACKGROUND OF THE INVENTION

The present invention relates to a wheel assembly state informing system and a wheel assembly state informing method for acquiring pieces of wheel assembly information on wheel assemblies of any one of various kinds of vehicles such as a vehicle having at least four or more wheels or a two-wheel vehicle and informing states of the respective wheel assemblies based on those pieces of information. Those vehicles include passenger vehicles, buses, and trucks. The pieces of wheel assembly information include, for example, pieces of information on tires as components of the wheel assemblies, such as internal pressure data and temperature data on the tires.

Nowadays it has been proposed to fit a tire internal pressure warning system to each of various kinds of vehicles such as passenger vehicles, buses, trucks, and even motorbikes, which have wheel assemblies that are constructed by mounting tires on rims respectively. The tire internal pressure warning system constantly monitors an internal pressure of a tire and informs an abnormality in the internal pressure of the tire when necessary.

A conventionally proposed tire internal pressure warning system is installed in a vehicle equipped with a plurality of wheel assemblies. For example, pressure sensors and transmitters are provided respectively in tire hollow regions of the plurality of wheel assemblies. The tire hollow regions are surrounded by inner peripheral faces of tires and bottom faces of rim bottoms respectively and filled with air. The pressure sensors mounted to the wheel assemblies respectively measure internal pressures of the tire hollow regions. Internal pressure data on the respective tire hollow regions are transmitted by wireless transmission from the transmitters mounted to the respective wheel assemblies, respectively.

On the other hand, a receiver and an indicator are provided on a vehicle body side. The receiver receives internal pressure data that are transmitted by wireless transmission from the transmitters respectively. Based on the respective internal pressure data received, the receiver monitors whether or not states of the tires of which the internal pressure data have been obtained are abnormal respectively. The states of the tires refer to internal pressure levels of the tire hollow regions. The indicator is provided to inform an operator of the vehicle of the states of the respective tires. When the receiver determines that the state of a specific one of the plurality of tires of the vehicle is abnormal, the indicator informs the operator of the vehicle that the state of the specific one of the tires (the internal pressure level of the tire) is abnormal.

It is important in this tire internal pressure warning system that the operator of the vehicle surely grasps which one of the plurality of the tires outfitted to the vehicle is in an abnormal state. If the operator of the vehicle can surely grasp which one of the tires is in an abnormal state, an advantage is obtained especially in the case where an abnormality occurs in the tire. For example, the operator of the vehicle can swiftly specify the tire in which the abnormality has occurred, and can quickly perform operations of supplying a supplementary air pressure, replacing the tire, and the like.

In general, a plurality of tires mounted to a vehicle do not have characteristic appearances that are different among the tires and make the tires mutually distinguishable in external appearance. Therefore, the operator of the vehicle used to identify the plurality of tires respectively according to mounting positions of the tires (e.g., a front-right wheel, a front-left wheel, a rear-right wheel, a rear-left wheel, etc.). Thus, with the conventional tire internal pressure warning system, the operator of the vehicle used to grasp states of the individual tires by causing the indicator to indicate the mounting positions of the tires and the states of the respective tires in an associative manner.

One such tire internal pressure warning system (first tire internal pressure warning system) has been proposed which utilizes a correlation between transmitters mounted to respective tires and pieces of information on mounting positions of the respective tires. In the first tire internal pressure warning system thus configured, the correlation between the transmitters provided in the respective tires and the pieces of information on the mounting positions of the respective tires (first correlation) is prestored in a receiver. The receiver receives internal pressure data on the respective tires which have been transmitted from the transmitters mounted to the respective tires. Using the first correlation, the receiver determines the mounting positions of the respective tires corresponding to the respective internal pressure data received. The first tire internal pressure warning system as described above is disclosed in, for example, JP 8-505939 A.

Another tire internal pressure warning system (second tire internal pressure warning system) has also been proposed which uses a correlation between pieces of information on positions of a plurality of tire houses of a vehicle body and pieces of information on positions of antennas provided to the tire houses respectively. In this second tire internal pressure warning system, a correlation between pieces of information on mounting positions of the antennas and pieces of information on mounting positions of the tire houses (second correlation) is prestored in a receiver. The respective antennas receive respective internal pressure data that have been transmitted from transmitters mounted to the tires outfitted to the vehicle. That is, the respective antennas receive internal pressure data on the tires, which are transmitted from the transmitters mounted to the tires outfitted to the vehicle. The receiver receives the internal pressure data received by the respective antennas respectively, and specifies the internal pressure data transmitted from the transmitter closest to the tire house provided with each of the antennas for each antenna. Using the aforementioned second correlation, the receiver determines positions of the tire houses corresponding to the respective internal pressure data received by the respective antennas. The second tire internal pressure warning system as described above is disclosed in, for example, JP 10-104103 A.

In the aforementioned first warning system, the transmitters mounted to the plurality of tires respectively hold specific pieces of identification information (ID's) respectively. The respective transmitters then transmit the specific pieces of identification information (ID's) as well as the internal pressure data to the receiver. The correlation between the respective pieces of identification information on the respective transmitters and the mounting positions of the respective tires provided with the respective transmitters is prestored in a memory of the receiver. Based on this stored correlation, the receiver determines the mounting positions of the tires corresponding to the received internal pressure data respectively. The indicator then associates the acquired internal pressure data with the mounting positions of the corresponding tires and indicates them. By visually checking the indicated data, the operator of the vehicle can respectively specify the tires from which the indicated pieces of wheel assembly information (internal pressure data) are acquired respectively, according to the mounting positions of the tires.

In the second warning system, the tire houses of the vehicle body are provided with antennas respectively. The pieces of information on the mounting positions of the respective antennas (e.g., the front-right tire house, the front-left tire house, the rear-right tire house, the rear-left tire house, etc.) are prestored in a memory of the receiver connected to the respective antennas. The receiver receives internal pressure data received by the respective antennas, and specifies the internal pressure data transmitted from the transmitters closest to the tire houses provided with the respective antennas (i.e., the transmitters mounted to the tires closest to the respective antennas) for each antenna. More specifically, the receiver extracts internal pressure data with a maximum signal power from a plurality of internal pressure data received by one of the antennas. The receiver then specifies the extracted internal pressure data as the internal pressure data transmitted from the transmitter closest to the tire house provided with the one of the antennas. Then, using the aforementioned second correlation, the receiver respectively determines the positions of the tire houses corresponding to the internal pressure data received by the receiver. In the second warning system, the mounting positions of the tires corresponding to the internal pressure data received by the receiver are specified respectively from the positions of the tire houses mounted with the antennas. The indicator then associates the acquired internal pressure data with the mounting positions of the corresponding tires respectively, and indicates them. By visually checking the indicated data, the operator of the vehicle can respectively specify the tires from which the indicated pieces of wheel assembly information (internal pressure data) are acquired, according to the positions of the tire houses.

In the vehicle, however, a so-called rotation of the wheel assemblies including the tires, that is, a permutation of the mounting positions of the wheel assemblies in the vehicle is carried out. This rotation of the wheel assemblies is carried out every time the vehicle covers a certain running distance or if need arises, so as to prevent life of the tires from being reduced due to the occurrence of partial abrasion of tire tread portions. The transmitters are fixed to the hollow regions of the tires. Therefore, even when the rotation of the wheel assemblies is carried out, the transmitters remain fixed to the wheel assemblies whose mounting positions are changed. In other words, the wheel assemblies whose mounting positions are changed are set at different mounting positions while the transmitters remain fixed. Therefore, the correlation between the pieces of identification information on the transmitters and the mounting positions of the wheel assemblies changes every time the rotation is carried out.

In the case where such a rotation of the wheel assemblies is carried out, the first correlation stored in advance becomes different from an actual correlation after the rotation of the wheel assemblies in the first tire internal pressure warning system. This causes a problem in that after the rotation of the wheel assemblies, the tires corresponding to the internal pressure data received by the receiver (the tires of which the internal pressure data are received) cannot be accurately specified. In order to accurately determine the tires corresponding to the respective internal pressure data received by the receiver after the rotation of the wheel assemblies as well, an associating operation for the correlation needs to be performed again every time a rotation of the wheel assemblies is carried out. This associating operation is troublesome and may lead to erroneous storage of a correlation.

In the second warning system, the tires corresponding to the internal pressure data received by the receiver are determined respectively according to the positions of the antennas that have received the internal pressure data (the positions of the tire houses mounted with the antennas that have received the internal pressure data). Therefore, in a vehicle such as a truck in which a plurality of tires are installed adjacently in a single tire house, the internal pressure data received by the receiver cannot be specified.

To configure the second warning system described above, it is necessary to install the plurality of antennas in the vicinity of each of the tire houses. Thus, very troublesome operations such as an operation of installing those antennas and an operation of wiring cables for connection are required. In particular, when a vehicle currently unmounted with a tire internal pressure warning system is newly mounted with the tire internal pressure warning system, there are problems in that troublesomeness and difficulty arise in a mounting operation and that an immeasurable cost and an enormous amount of time are required.

SUMMARY OF THE INVENTION

The present invention has been made to solve the aforementioned problems. It is an object of the present invention to provide a wheel assembly state informing system and a wheel assembly state informing method that can be easily mounted and applied to a vehicle without requiring any troublesome operation and make it possible to specify which wheel assemblies pertain to pieces of wheel assembly information received by a receiver respectively.

In order to achieve the above object, the present invention provides a wheel assembly informing system including: a plurality of wheel assembly identification indicating members that are respectively mounted to a plurality of wheel assemblies mounted to a vehicle body and have different characteristic appearances among the plurality of wheel assemblies, the characteristic appearances making the respective wheel assemblies mutually distinguishable in external appearance; a plurality of first communication devices that are respectively mounted to the plurality of wheel assemblies and transmit by wireless transmission pieces of wheel assembly information on the respective wheel assemblies as well as self-held pieces of identification information from the wheel assembly sides; a storage device that is provided on the vehicle body side and stores a correlation between pieces of information on the characteristic appearances of the wheel assembly identification indicating members mounted to the plurality of wheel assemblies respectively and the pieces of identification information held by the first communication devices; a second communication device that receives the pieces of wheel assembly information and identification information transmitted from the first communication devices, extracts from the received pieces of identification information the pieces of information on the characteristic appearances corresponding to the received pieces of identification information by referring to the correlation stored by the storage device, and specifies each one of the plurality of wheel assemblies from which the pieces of wheel assembly information are transmitted; and an informing device that informs states of the specified wheel assemblies individually based on the pieces of wheel assembly information.

As the pieces of wheel assembly information, it is possible to use pieces of information on the tires as components of the wheel assemblies such as internal pressure data and temperature data on the tires.

In this case, the wheel assembly state informing system is preferably configured such that the informing device expresses the wheel assemblies from which the pieces of wheel assembly information are transmitted in an identifiable manner using at least one of a character, a symbol, and a color corresponding to each of the characteristic appearances extracted by the second communication device, and informs each of the states of the wheel assemblies in a manner corresponding to at least one of the character, the symbol, and the color which is expressed in an identifiable manner.

Further, the wheel assembly state informing system is preferably configured such that: the wheel assembly identification indicating members are determined according to the first communication devices that are mounted to the wheel assemblies respectively; and each of the wheel assembly identification indicating members is mounted to a corresponding one of the wheel assemblies to which a corresponding one of the first communication devices is mounted.

Further, the wheel assembly state informing system is preferably configured such that the wheel assembly identification indicating members constitute the characteristic appearances by being colored at least a partial portion in mutually distinguishable colors.

Note that the wheel assembly state informing system is preferably configured such that each of the wheel assembly identification indicating members includes at least a wheel center cap, a valve cap, and a valve washer.

The wheel assembly state informing system is preferably configured such that: sensors connected to the first communication devices are mounted to the plurality of wheel assemblies respectively; and the pieces of wheel assembly information are measurement data obtained by the sensors connected to the first communication devices and mounted to the wheel assemblies. In this case, preferably, the sensors include at least one group of tire internal pressure sensors mounted to the wheel assemblies and temperature sensors mounted to the wheel assemblies. Preferably, the second communication device compares values of the measurement data with a preset allowable range for measurement data, and the informing device informs the states of the wheel assemblies according to a result of the comparison.

The wheel assembly state informing system is preferably configured such that: the sensors are tire internal pressure sensors mounted to the wheel assemblies; the second communication device compares tire internal pressures measured by the tire internal pressure sensors with the allowable range; and the informing device issues a warning when the tire internal pressures are outside the allowable range.

Further, the present invention provides a wheel assembly informing method for informing states of a plurality of wheel assemblies individually mounted with wheel assembly identification indicating members having characteristic appearances, which are different among the wheel assemblies and make the respective wheel assemblies identifiable in external appearance, the method including: transmitting by wireless transmission, from first communication devices that are respectively mounted to the plurality of wheel assemblies mounted to a vehicle body, pieces of wheel assembly information on the respective wheel assemblies as well as pieces of identification information held by the respective first communication devices, from the wheel assembly sides; receiving the pieces of wheel assembly information and the pieces of identification information by means of a second communication device that is provided on the vehicle body side; specifying the respective wheel assemblies from which the pieces of wheel assembly information are transmitted, by referring to a correlation between prestored pieces of information on characteristic appearances of the wheel assembly identification indicating members and the pieces of identification information and extracting the pieces of information on the characteristic appearances corresponding to the pieces of identification information received by the second communication device; and informing the states of the specified wheel assemblies individually based on the pieces of wheel assembly information.

According to the wheel assembly state informing system and the wheel assembly state informing method of the present invention, even when mounting positions of the wheel assemblies are changed as a result of a rotation of the wheel assemblies or the like, the wheel assemblies corresponding to informed wheel assembly states can be reliably specified respectively. Further, the wheel assembly state informing system of the present invention can be easily installed to the vehicle without requiring any troublesome or complicated operation such as an associating operation. The wheel assembly state informing system of the present invention also has an excellent effect of being easily installed to the vehicle at a low cost and within a short period.

It should be noted that the present application claims priority from Japanese Patent Application No. 2004-140157, the entire contents of which are incorporated herein.

BRIEF DESCRIPTION OF THE DRAWINGS

The foregoing and further objects, features and advantages of the present invention will become apparent from the following description of a preferred embodiment with reference to the accompanying drawings, in which.

DETAILED DESCRIPTION OF THE PREFERRED EMBODIMENT

Hereinafter, a wheel assembly state informing system and a wheel assembly state informing method of the present invention will be described in detail based on a preferred embodiment shown in the accompanying drawings.

Figure 1:
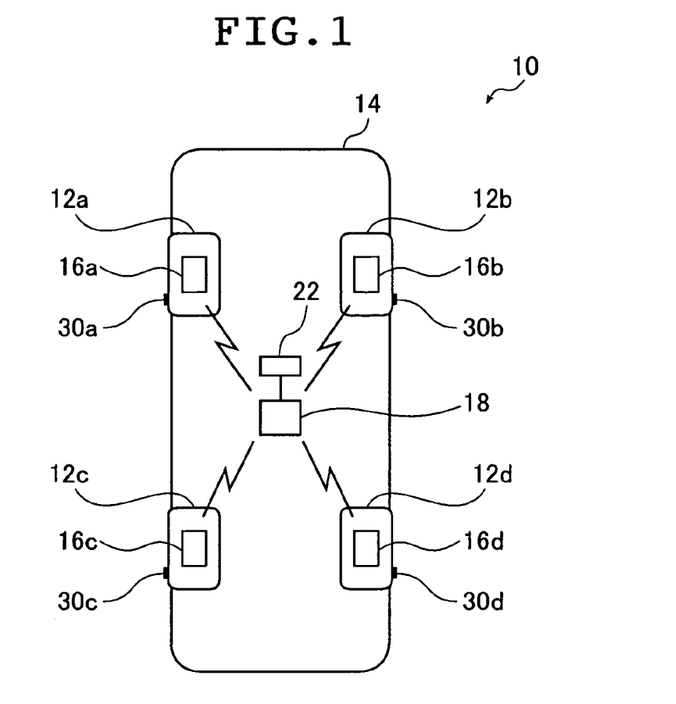
FIG. 1 is a schematic diagram of a tire internal pressure warning system as an example of a wheel assembly state informing system of the present invention.

FIG. 1 is a schematic diagram showing a tire internal pressure warning system 10 of a passenger vehicle as an example of a wheel assembly state informing system.

As shown in FIG. 1, the tire internal pressure warning system 10 is provided in a passenger vehicle 14 (the vehicle 14). The vehicle 14 is constructed with wheel assemblies 12a to 12d mounted at wheel assembly mounting positions respectively. Each of the wheel assemblies 12a to 12d is an assembly of a tire and a rim.

In hollow regions of the respective tires of the wheel assemblies 12a to 12d, transmitters (first communication devices) 16a to 16d are securely installed on faces of rim bottom portions serving as wall surfaces of those regions. The transmitters (first communication devices) 16a to 16d are connected to pressure sensors and temperature sensors as will be described later. The transmitters 16a to 16d transmit later-described internal pressure data as well as later-described transmission ID's respectively. Valve caps 30a to 30d as wheel assembly identification indicating members are securely installed on the wheel assemblies 12a to 12d respectively.

The passenger vehicle 14 is provided with a receiver (second communication device) 18. The receiver 18 receives pieces of information transmitted by wireless transmission from the transmitters 16a to 16d respectively. The receiver 18 is connected to an indicator (informing device) 22. Based on internal pressure data for the respective wheel assemblies, the indicator 22 separately indicates states of the respective wheel assemblies and respectively informs a driver of the passenger vehicle 14 of the states of the respective wheel assemblies.

The tire internal pressure warning system 10 of this embodiment is configured by securely installing the transmitters 16a to 16d and the valve caps 30a to 30d on the wheel assemblies 12a to 12d of the vehicle 14 respectively and mounting the receiver 18 and the indicator 22 to a main body of the vehicle 14.

The valve caps 30a to 30d as the wheel assembly identification indicating members have mutually different characteristic appearances, which make it possible to distinguish the valve caps 30a to 30d from one another in external appearance. The transmitters 16a to 16d hold the specific pieces of identification information (ID's) respectively.

A correlation between the respective pieces of identification information (ID's) of the transmitters 16a to 16d and the respective characteristic appearances of the valve caps 30a to 30d is prestored in a later-described memory 74 (see FIG. 5) of the receiver 18. In accordance with a combination based on the prestored correlation, the transmitters 16a to 16d and the valve caps 30a to 30d are mounted to the wheel assemblies 12a to 12d respectively.

Since the wheel assemblies 12b to 12d are similar in construction to the wheel assembly 12a, the wheel assembly 12a will be described hereinafter as a representative of the wheel assemblies 12a to 12d, and description of the wheel assemblies 12b to 12d will be omitted.

Figure 2:
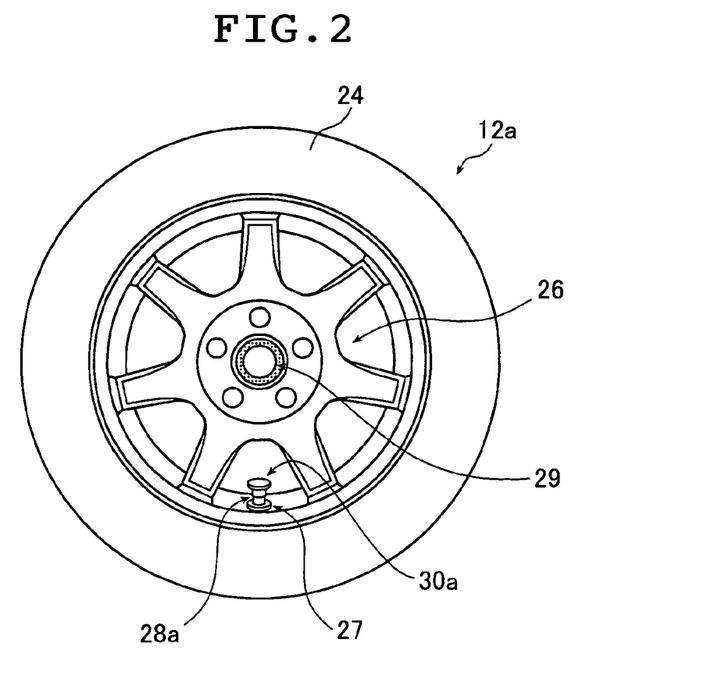
FIG. 2 is a schematic diagram showing an example of a wheel assembly in the tire internal pressure warning system shown in FIG. 1.

FIG. 2 is a schematic view showing the external appearance of the wheel assembly 12a. The wheel assembly 12a, which is constructed by mounting a tire main body 24 (tire 24) to a rim on which a wheel 26 is securely installed, is designed for an ordinary passenger vehicle. The wheel assembly 12a is provided with a valve 28a and a wheel center cap 29 for securing the wheel. The valve 28a serves as an air outlet/inlet communicating with a tire hollow region surrounded by the tire 24 and the rim. The valve 28a is provided with the valve cap 30a at its tip portion.

FIGS. 3A to 3D are enlarged external views of the valves 28a to 28d provided in the wheel assemblies 12a to 12d respectively.

Figure 3A:
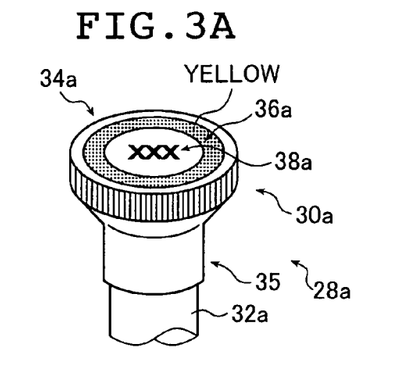
FIGS. 3A to 3D are schematic diagrams each showing in an enlarged manner a valve of the wheel assembly shown in FIG. 2.
Figure 3B:
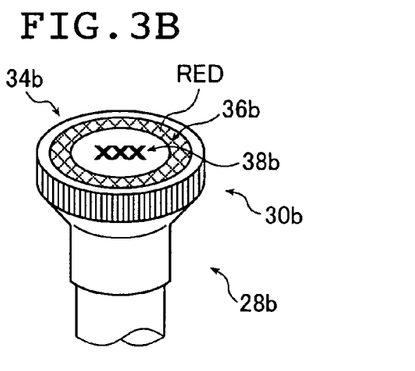
Figure 3C:
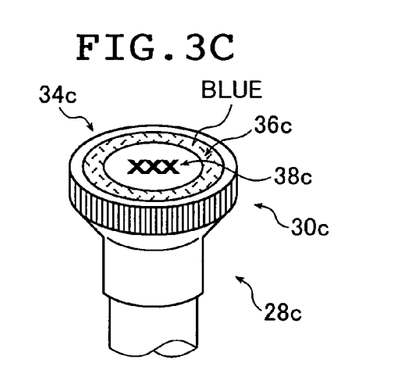
Figure 3D:
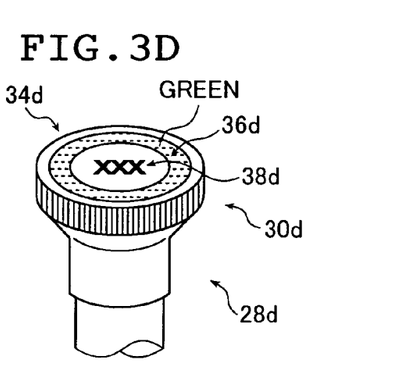

Since the valves 28b to 28d are similar in construction to the valve 28a, the valve 28a will be described as a representative of the valves 28a to 28d, and description of the valves 28b to 28d will be omitted. In the valve 28a, which is a known tire valve for a passenger vehicle, the valve cap 30a is securely screwed on a tip of a valve stem 32a protruding from a wheel 26a. The valve cap 30a has functions of protecting an air hole (not shown) formed in the valve stem 32a (known air hole for supplying air into a tire 24a or discharging air from the tire 24a) and preventing air from flowing out from the valve stem 32a. The valve cap 30a functions by being screwed on the tip of the valve stem 32a and sealing the valve stem 32a at its tip. External appearances such as the shape and color of the valve cap 30a do not have any particular influence on those functions. Therefore, the shape and color of the valve cap 30a can be changed in various ways.

In the tire internal pressure warning indicating system 10 of this embodiment, an upper face 34a of the valve cap 30a is substantially flat. The upper face 34a forms as a protruding end when the valve cap 30a is mounted to the valve stem 32a. The upper face 34a is larger in area than a cross section of a connecting portion 35 of the valve cap 30a (cross section substantially perpendicular to a direction in which the valve stem 32a protrudes). The connecting portion 35 connects the valve cap 30a to the valve stem 32a.

By using the valve cap 30a of this shape, an effect of making it easy to visually check the upper face 34a is achieved when the valve cap 30a is mounted to the valve stem 32a (wheel assembly 12a).

The upper face 34a of the valve cap 30a is provided with a colored region 36a. This colored region is coated with a coating material of a predetermined color (yellow in the case of the valve cap 30a). A person viewing the upper face 34a of the valve cap 30a can check the color (yellow) of the coating material. As shown in FIGS. 3A to 3D, the colored region 36a of the valve cap 30a is coated with the yellow coating material, and colored regions 36b, 36c, and 36d of the valve caps 30b, 30c, and 30d are coated with red, blue, and green coating materials respectively. A person viewing the upper face 34a of the valve cap 30a and upper faces 34b, 34c, and 34d of the valve caps 30b, 30c, and 30d can check the colors of the respective coating materials.

In the tire internal pressure warning indicating system 10 of this embodiment, the wheel assemblies 12a to 12d can thus be visually distinguished according to the colors (hereinafter referred to as characteristic colors) of the respective colored regions of the valve caps 30a to 30d.

The characteristic appearances of the valve caps 30a to 30d for making it possible to visually distinguish the wheel assemblies 12a to 12d are not limited to the characteristic colors. For example, as shown in FIGS. 3A to 3D, the upper faces 34a to 34d of the valve caps 30a to 30d may be provided with character marking regions 38a to 38d respectively, and the character marking regions 38a to 38d may be respectively marked with specific symbols or characters that are different among the wheel assemblies. Alternatively, for example, the wheel assemblies may be made visually distinguishable from one another by shaping the respective upper faces 34a to 34d of the valve caps 30a to 30d differently according to the respective wheel assemblies.

In the present invention, the characteristic appearances making it possible to visually distinguish the respective wheel assemblies from one another are not particularly limited.

The wheel assembly identification indicating members are not particularly limited either. For example, the wheel center cap 29a shown in FIG. 2 may be used as a wheel assembly identification indicating member. Alternatively, a valve washer 27 (see FIG. 2) may also be used as a wheel assembly identification indicating member. The respective wheel assemblies can be made visually distinguishable by, for example, mounting the respective wheel assemblies with the wheel center caps 29 with characteristic appearances (colors or shapes) which vary between the wheel assemblies.

The transmitters 16a to 16d are mounted to the respective wheel assemblies 12a to 12d respectively. As described above, the correlation between the characteristic appearances of the respective valve caps 30a to 30d and the pieces of identification information (ID's) specific to the respective transmitters 16a to 16d is prestored in the later-described memory 74 of the receiver 18. The valve caps 30a to 30d and the transmitters 16a to 16d are mounted to the respective wheel assemblies according to a combination based on the stored correlation.

Figure 4:
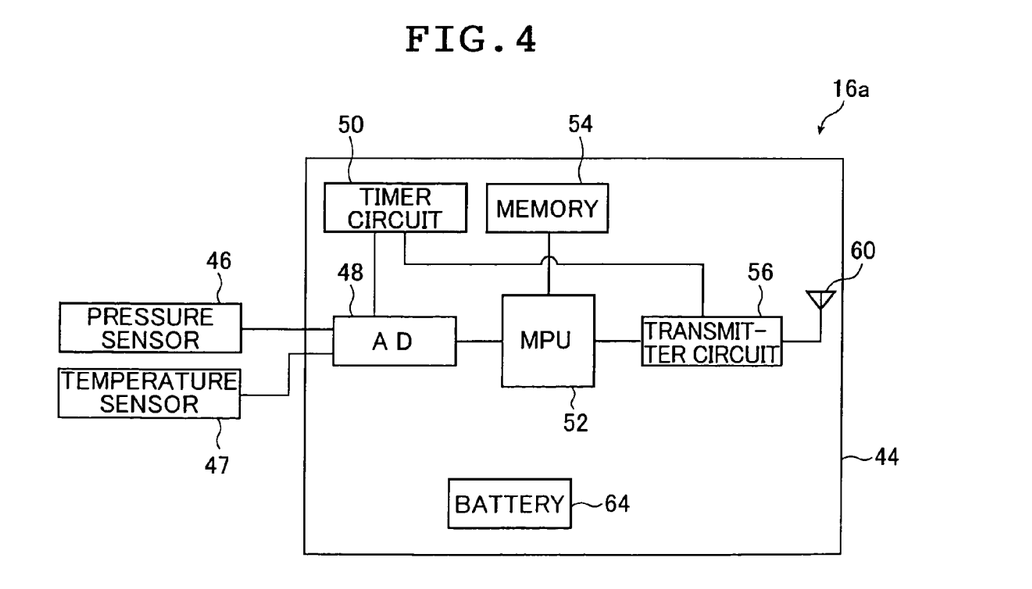
FIG. 4 is a schematic diagram of an example of a transmitter of the tire internal pressure warning system shown in FIG. 1.

The transmitters 16a to 16d transmit by wireless transmission internal pressure data and temperature data on the tires provided with the respective transmitters as well as the pieces of identification information (ID's) specific to the respective transmitters, at predetermined time intervals. Since the transmitters 16b to 16d are similar in configuration to the transmitter 16a, the transmitter 16a will be described as a representative of the transmitters 16a to 16d, and description of the transmitters 16b to 16d will be omitted. FIG. 4 is a schematic block diagram of the transmitter 16a and of a pressure sensor 46 and a temperature sensor 47 that are connected to the transmitter 16a.

The transmitter 16a transmits by wireless internal pressure data and temperature data on the tire provided with the transmitter 16a (the tire 24 as a component of the wheel assembly 12a) as well as the piece of identification information (ID) specific to the transmitter 16a, at predetermined time intervals. The transmitter 16a has respective circuits on a circuit board 44, and is connected to the pressure sensor 46 for measuring an internal pressure of a tire and the temperature sensor 47.

The pressure sensor 46, which is a semiconductor pressure sensor or a capacitance pressure sensor for measuring a gauge pressure, a differential pressure, or an absolute pressure, measures an internal pressure of the tire 24 (pressure in the hollow region of the tire 24). The temperature sensor 47, which is a semiconductor temperature sensor or a resistance element temperature sensor, measures a temperature in the hollow region of the tire 24. The pressure sensor 46 and the temperature sensor 47 are connected to a later-described AD conversion circuit 48.

The circuit board 44 is provided with the AD conversion circuit (AD) 48, a timer circuit 50, a microprocessor (MPU) 52, a memory 54, a transmitter circuit 56, a transmission antenna 60, and a battery 64 serving as a power source for the respective circuits.

The AD conversion circuit 48 is connected to the pressure sensor 46 and the temperature sensor 47, and converts pressure data measured by the pressure sensor 46 and temperature data measured by the temperature sensor 47 into digital signals, for example, eight-bit signals.

The timer circuit 50 manages times (timings) when the transmitter 16a acquires internal pressure data and temperature data on the tire 24. The timer circuit 50 also manages times (timings) when the transmitter 16a transmits the measured data. Due to the management by the timer circuit 50, the transmitter 16a measures an internal pressure and a temperature in the tire 24 at regular time intervals (e.g., 6 seconds), for example, when the internal pressure of the tire 24 is normal (when the internal pressure is within a preset allowable range). Then, the transmitter 16a repeatedly transmits internal pressure data and temperature data toward the receiver 18 from the transmission antenna 60, at regular time intervals (e.g., 60 seconds). The timer circuit 50 may be configured as a dedicated circuit or programmed in the MPU 52.

Thus, when the internal pressure of the tire 24 is normal, the timer circuit 50 is set in a sleep mode, when the respective components of the transmitter 16a are driven at regular time intervals. In this sleep mode, the transmitter 16a does not perform any processing or transmit any data unless the respective components are driven. The sleep mode is thus set when the internal pressure of the tire 24 is normal, because a large driving power is required if the AD conversion circuit 48, the MPU 52, and, the transmitter circuit 56 are always driven. By setting the sleep mode when the internal pressure of the tire 24 is normal, power consumption of the battery 64 is reduced, so that the transmitter 16a can monitor the internal pressure of the tire 24 over a long period. When it is determined that the internal pressure of the tire 24 is outside the preset allowable range and thus abnormal, it goes without saying that the measurement and transmission are carried out at shorter time intervals.

The MPU 52 generates a transmission signal to be transmitted to the receiver 18, and controls and manages operations of the respective circuits. The MPU 52 generates a transmission signal using internal pressure data and temperature data supplied from the AD conversion circuit 48, identification information (ID) on the transmitter 16a invoked from the memory 54, and a word signal. The identification information on the transmitter 16a is information (ID) specific to the transmitter 16a which makes it possible to distinguish the transmitter 16a from the other transmitters 16b to 16d. The transmission signal generated by the MPU 52 is generated such that repetitive continuation of signals in a predetermined form is ensured. In the ID and the word signal, a specific number of bits of "0" and "1" are continuously arranged according to a predetermined rule. The word signal is obtained by, for example, repeatedly arranging three blocks in each of which 10 bits of "0" are first arranged and then 10 bits of "1" are arranged.

The memory 54 can store and hold the ID of the transmitter 16a and can also store the measured internal pressure data and temperature data.

The transmitter circuit 56 has an oscillating circuit (not shown), a modulation circuit (not shown), and an amplifying circuit (not shown). The oscillating circuit generates a carrier wave of a predetermined frequency, for example, 315 MHz. In accordance with a transmission signal generated by the MPU 52, the modulation circuit generates a high-frequency signal which is obtained by modulating the carrier wave. The amplifying circuit amplifies the generated high-frequency signal. The carrier wave may be modulated according to any known mode such as an ASK (Amplitude shift keying) mode, an FSK (Frequency shift keying) mode, a PSK (Phase shift keying) mode, a multi-PSK mode such as QPSK or 8-PSK, or a multi-ASK mode such as 16QAM or 64QAM.

The antenna 60 is so configured as to radiate an electric wave of, for example, 315 MHz toward the receiver 18. A known battery such as CR-2032 (coin-shaped manganese dioxide-lithium battery) is employed as the battery 64.

The transmitter 16a is configured as described above. The transmitters 16b to 16d are also similar in configuration to the transmitter 16a and function in a similar manner to the transmitter 16a.

Figure 5:
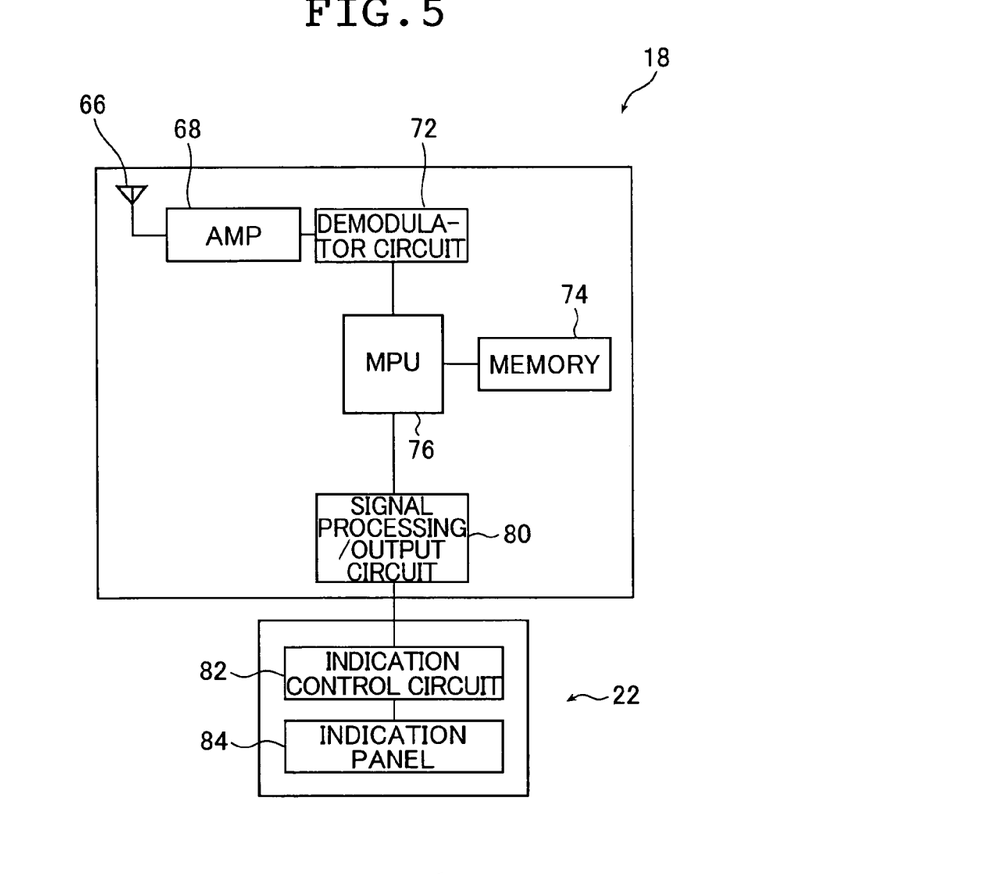
FIG. 5 is a schematic diagram of an example of a receiver of the tire internal pressure warning system shown in FIG. 1.

FIG. 5 is a schematic diagram of the receiver 18 and the indicator 22. As described above, the transmitters 16a to 16d transmit by wireless transmission internal pressure data and temperature data on the tires provided with the respective transmitters as well as the pieces of identification information (ID's) specific to the respective transmitters. The receiver 18 receives the data and pieces of information transmitted by the transmitters 16a to 16d respectively, that is, the internal pressure data and temperature data on the respective tires and the pieces of identification information (ID's) on the respective transmitters. The receiver 18 then refers to the relationship previously stored and held in the memory 74, that is, the correlation between pieces of information on the characteristic appearances of the valve caps 30a to 30d and the respective pieces of identification (ID's). Based on the correlation referred to, the receiver 18 determines what type of characteristic appearance is given to a valve cap provided to the assembled wheel of which the internal data and temperature data have been received together with the identification information (ID's). In other words, the receiver 18 determines what type of characteristic appearance is given to a valve cap provided to the assembled wheel that is composed of the tires of which the internal pressure data and temperature data have been received. The receiver 18 also makes determinations on states of the tires of which the internal pressure data are measured (internal pressure levels in the hollow regions of the tires) by comparing the respective acquired internal pressure data with a preset numerical range. The receiver 18 then associates the corresponding internal pressure data and the corresponding pieces of information on the characteristic appearances with respective determination results, generates a signal to be transmitted to the indicator 22, and outputs it. The indicator 22 receives the signal outputted from the receiver 18.

The indicator 22 indicates wheel assembly images corresponding to the characteristic appearances of the wheel assemblies respectively on an indication panel 84. At this moment, the indicator 22 indicates wheel assembly images corresponding to the characteristic appearances of the respective wheel assemblies according to indication modes based on the aforementioned determination results respectively, which are included in the received signal. Thus, the indicator 22 informs an operator of the vehicle 14 of the states of the respective wheel assemblies.

The receiver 18 is constituted of an antenna 66, an amplifying circuit (AMP) 68, a demodulator circuit 72, the memory 74, the MPU 76, and a signal processing/output circuit 80. The antenna 66 is so configured as to receive electric waves of high-frequency signals of, for example, 315 MHz, which have been transmitted from the transmitters 16a to 16d respectively. The amplifying circuit 68, which is constituted of an FET (field-effect transistor) and the like, amplifies the received high-frequency signals and supplies them to the demodulator circuit 72.

The demodulator circuit 72 generates signals such as are obtained by subjecting the supplied high-frequency signals to a known filtering processing, correcting their codes, and then demodulating the signals. The demodulation circuit 72 supplies the demodulated signals to the MPU 76.

The memory 74 stores and holds the correlation between the respective pieces of identification information (ID's) on the transmitters 16a to 16d and the pieces of information on respective characteristic colors of the valve caps 30a to 30d. The information on the correlation is stored and held in the memory 74 before the transmitters 16a to 16d and the valve caps 30a to 30d are mounted to the wheel assemblies 12a to 12d respectively. The aforementioned valve caps 30a to 30d and transmitters 16a to 16d are mounted to the wheel assemblies respectively according to a combination based on the correlation stored in the memory 74.

The MPU 76 acquires the pieces of identification information (ID's), the internal pressure data, and the temperature data respectively from the signals supplied from the demodulation circuit 72. Referring then to the aforementioned correlation stored and held in the memory 74, the MPU 76 specifies the characteristic colors of the tires (characteristic colors of the valve caps) from which the acquired pieces of identification information (ID's) have been transmitted. The MPU 76 then associates the internal pressure data and the temperature data, which have been transmitted together with the pieces of identification information (ID's), with the pieces of information on the specified characteristic colors respectively, and supplies the data to the signal processing/output circuit 80.

Using the supplied temperature data, the signal processing/output circuit 80 subjects the corresponding internal pressure data to temperature compensation. The signal processing/output circuit 80 also compares the internal pressure data subjected to temperature compensation with a preset numerical range. In accordance with a result of this comparison, the signal processing/output circuit 80 classifies the corrected internal pressure data into, for example, three states, that is, "normal", "attention", and "warning" (makes determinations on internal pressure states of the tires). The signal processing/output circuit 80 associates the compensated internal pressure data with the pieces of information on the characteristic colors corresponding to the internal pressure data and the pieces of information on the determination results corresponding to the respective internal pressure data. The signal processing/output circuit 80 generates a signal to be transmitted to the indicator 22 from the associated pieces of information, and supplies the generated signal to the indicator 22.

The indicator 22 constitutes an indication control circuit 82 and an indication panel 84. The indication control circuit 82 outputs an indication signal to the indication panel 84, and controls an indicating operation of the indication panel 84.

The indication control circuit 82 receives a signal outputted from the signal processing/output circuit 80 of the receiver 18. This signal includes the compensated internal pressure data, the pieces of information on the characteristic colors associated with the internal pressure data, and the pieces of information on the determination results associated with the internal pressure data. The indication control circuit 82 causes the indication panel 84 to indicate wheel assembly images based on the characteristic colors associated with the internal pressure data, according to an indication mode based on the determination results associated with the internal pressure data.

Figure 6:
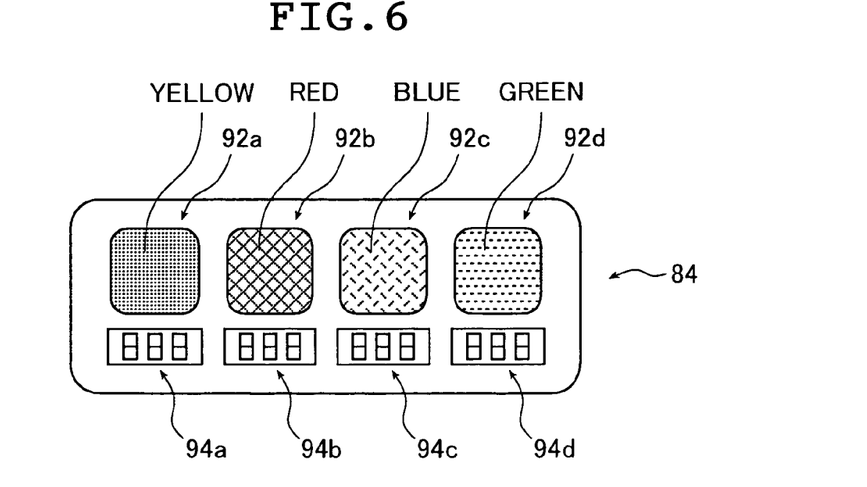
FIG. 6 is a schematic diagram showing an indicator panel of the tire internal pressure warning system shown in FIG. 1.

FIG. 6 shows an external appearance of the indication panel 84. The indication panel 84 is installed close to a driver seat of the vehicle 14, and so disposed as to be visually checked by a driver of the vehicle 14.

The indication panel 84 indicates wheel assembly images representing the wheel assemblies 12a to 12d respectively, such that the wheel assemblies can be distinguished from one another. The respective wheel assembly images are symbolized based on the respective characteristic colors of the valve caps 30a to 30d provided to the wheel assemblies 12a to 12d.

As shown in FIG. 6, the indication panel 84 is provided with lamps 92a to 92d, which correspond to the valve caps 30a to 30d respectively and individually. The lamps 92a to 92d emit light beams of the same colors as the characteristic colors (yellow, red, blue, and green) of the corresponding valve caps 30a to 30d, respectively.

The lamps 92a to 92d emitting light beams of the same colors as the characteristic colors of the corresponding valve caps 30a to 30d respectively, means the lamps emit light beams of wavelengths corresponding to the characteristic colors of the valve caps 30a to 30d respectively.

The emitted light beams correspond in color (wavelength) to the valve caps 30a to 30d respectively. The respective light beams allow any person to determine which ones of the lamps 92a to 92d correspond to the characteristic colors of the valve caps 30a to 30d on a one-to-one basis respectively when visually observing the lamps 92a to 92d.

The indication panel 84 is provided with numeral indicating portions 94a to 94d in the vicinity of the lamps 92a to 92d respectively. The numeral indicating portions 94a to 94d indicate measured values of internal pressures (values represented by internal pressure data) of the tires of the wheel assemblies 12a to 12d respectively, in a manner corresponding to the respective lamps. In the tire internal pressure warning indicating system of this embodiment, the lamps 92a to 92d are thus caused to emit light beams of the same colors as the characteristic colors of the valve caps 30a to 30d respectively, whereby the wheel assemblies 12a to 12d provided with the valve caps 30a to 30d are expressed symbolically.

By visually checking the colors of the light beams emitted by the lamps 92a to 92d, the driver of the vehicle 14 can grasp the characteristic colors of the valve caps corresponding to the lamps. Thus, the driver of the vehicle 14 can identify the wheel assemblies represented by the respective lamps, based on the characteristic colors of the valve caps provided to the respective wheel assemblies.

The indication control circuit 82 controls emission of light beams by the respective lamps 92a to 92d. When the wheel assemblies are in normal states, namely, when the internal pressures in the tires of the respective wheel assemblies are within a "normal" range, the lamps corresponding to the respective wheel assemblies continue to emit light beams ("normal" mode).

When the internal pressure of the tire in a specific one of the wheel assemblies is within an "attention" range, the lamp corresponding to the characteristic color of the valve cap that is securely installed on the specific one of the wheel assemblies turns on according to a predetermined "attention" mode. In this "attention" mode, for example, the respective lamps repeatedly turn on and off at intervals of 3 seconds.

When the internal pressure of the tire of each of the wheel assemblies is within a "warning" range, the lamp corresponding to the wheel assembly turns on according to a predetermined "warning" mode. In this "warning" mode, for example, the lamps repeatedly turn on and off at intervals of 1 second.

The numeral indicating portions 94a to 94d indicate the measured values of the internal pressures of the tires of the wheel assemblies respectively.

In the tire internal pressure warning indicating system 10 of this embodiment, the plurality of lamps thus emitting light beams of the colors corresponding to the characteristic colors of the respective wheel assemblies indicate the wheel assembly images representing the respective wheel assemblies. The lamps 92a to 92d are caused to emit light beams according to a light emission mode corresponding to the tire internal pressure data (wheel assembly information), whereby states of the respective wheel assemblies are expressed. The values of internal pressures measured in the respective tires are indicated in association with the respective wheel assembly images, whereby the internal pressures of the tires of the wheel assemblies are indicated. When the valve caps are externally characterized not in color but in, for example, the shapes of their upper faces, the lamps may be so shaped as to correspond to the respective wheel assemblies.

In the wheel assembly state informing system of the present invention, the informing device is not limited to the indication panel in which the lamps are arranged but may be, for example, a predetermined CRT or LCD display. In this case, the respective wheel assemblies may be expressed in an identifiable manner by indicating the wheel assembly images based on the characteristic appearances (colors or shapes) of the wheel assembly identification indicating members of the respective wheel assemblies on a screen of the CRT or the LCD display. Symbols (including diagrams, photographs, and illustrations), characters, and the like, which are based on the characteristic appearances (colors or shapes) of the wheel assembly identification indicating members of the respective wheel assemblies, are listed as examples of the wheel assembly images. The informing device in the wheel assembly state informing system of the present invention is not limited in particular.

The tire internal pressure warning system 10 of this embodiment is configured as described above. In this tire internal pressure warning system 10, a tire internal pressure warning informing method as a wheel assembly state informing method of the present invention is carried out as will be described below.

In the vehicle 14, the transmitters 16a to 16d transmit by wireless transmission respective transmission ID's as well as internal pressure data and temperature data on the respective tires at predetermined time intervals (transmission step). The vehicle 14 is mounted in advance with the receiver 18 and the indicator 22. The transmitters 16a to 16d and the valve caps 30a to 30d are securely installed on the wheel assemblies 12a to 12d respectively. As described above, the receiver 18 receives the respective transmission ID's as well as the internal pressure data and temperature data on the tires from the tires from the transmitters 16a to 16d (reception step).

The receiver 18 then refers to the correlation between the pieces of information on the characteristic appearances of the valve caps 30a to 30d and the respective transmission ID's, which are stored and held in advance in the memory 74. The receiver 18 determines (specifies), from the received transmission ID's, which wheel assemblies or which characteristic appearances of the identification indicating members provided to the wheel assemblies respectively pertain to the received internal pressure data and temperature data (wheel assembly specifying step).

By comparing the respective acquired internal pressure data with the preset numerical range, the receiver 18 makes determinations on states of the tires from which the respective internal pressure data are acquired. The receiver 18 then associates the respective internal pressure data with the determination results and the pieces of information on the characteristic appearances, generates a signal to be transmitted to the indicator 22, and outputs the signal. The indicator 22 then receives the signal outputted from the signal processing/output circuit 80 of the receiver 18. The indicator 22 causes the indication panel 84 to indicate wheel assembly images respectively representing the wheel assemblies from which the respective internal pressure data are acquired, according to an indication mode based on the determination results of the respective internal pressure data. Thus, the indicator 22 informs the states of the respective wheel assemblies to the operator of the vehicle 14 (informing step). Detailed operations of the respective components in the respective steps are as described above. The present invention also provides such a wheel assembly state informing method.

With the tire internal pressure warning system 10 of this embodiment, as described above, the respective wheel assemblies are made visually distinguishable not by the mounting positions of the wheel assemblies but by the characteristic appearances of the wheel assembly identification indicating members directly provided to the individual wheel assemblies. The respective wheel assemblies are indicated in an identifiable manner using the wheel assembly images symbolized based on those characteristic appearances, and the states of the respective wheels are expressed in association with the wheel assembly images, whereby the states of the respective wheel assemblies are informed to the operator of the vehicle 14.

In this construction, for example, when light beams are emitted from a specific one of the lamps according to a warning mode, the wheel assembly, on which the valve cap having the same characteristic color as the color of that lamp is securely installed, can be specified as a wheel with a reduced tire internal pressure, by visually checking that valve cap.

With the tire internal pressure warning system 10 of this embodiment, the indicator 22 indicates the respective wheel assemblies in an identifiable manner by turning on the lamps of the colors based on the characteristic appearances of the respective wheel assemblies. The respective lamps are turned on in lighting states (lighting modes) corresponding to the states of the corresponding wheel assemblies, whereby the states of the respective wheel assemblies are indicated (informed).

The wheel assembly state informing system of the present invention is not limited to the informing of the states of the respective wheel assemblies according to the lighting states of the lamps. For example, when the internal pressure of the tire of one of a plurality of wheel assemblies is within the aforementioned "warning" range, it is appropriate to inform that the internal pressure of the tire of that wheel assembly is within the "warning" range, by blinking only the one of the lamps corresponding to that wheel assembly within the "warning" range and sounding a predetermined buzzer sound indicating that the indicator 22 is in a warning mode. In the wheel assembly state informing system of the present invention, the mode of informing the states of the respective wheel assemblies is not limited in particular.

In the present invention, it is not absolutely required that the correlation between the pieces of information on the characteristic appearances of the wheel assembly identification indicating members and the pieces of identification information on the transmitters is stored before the wheel assembly identification indicating members and the transmitters are mounted to the wheel assemblies respectively. In the wheel assembly state informing system of the present invention, the correlation between the pieces of identification information on the transmitters and the pieces of information on the characteristic appearances of the wheel assembly identification indicating members may be stored into the memory after the wheel assembly identification indicating members and the transmitters have been mounted to the wheel assemblies respectively.

In this case, it is preferable that the informing device have a setting function for storing the correlation between the pieces of identification information on the transmitters and the pieces of information on the characteristic appearances of the wheel assembly identification indicating members into the memory.

The informing device is usually installed in the vicinity of the operator of the vehicle (operator's seat). By endowing the informing device with the setting function, the operator is allowed to easily store the aforementioned correlation.

Although the aforementioned embodiment handles the passenger vehicle with four wheel assemblies as an example, the present invention can be targeted for vehicles with at least two or more wheel assemblies. Further, the pieces of wheel assembly information are internal pressures and temperatures in the aforementioned embodiment. In the present invention, however, the pieces of wheel assembly information are not limited in particular as long as they represent states of the wheel assemblies which are measured by a sensor.

The wheel assembly state informing system and the wheel assembly state informing method of the present invention have been described hitherto in detail. As a matter of course, however, the present invention is not limited to the aforementioned embodiment and may be subjected to various modifications and changes as long as they do not depart from the spirit of the present invention.

What is claimed is:

1. A wheel assembly informing system, comprising:
   a plurality of wheel assembly identification indicating members that are respectively mounted to a plurality of wheel assemblies mounted to a vehicle body and have different characteristic appearances among the plurality of wheel assemblies, the characteristic appearances making the respective wheel assemblies mutually distinguishable in external appearance;
   a plurality of first communication devices that are respectively mounted to the plurality of wheel assemblies and transmit by wireless transmission pieces of wheel assembly information on the respective wheel assemblies as well as self-held pieces of identification information from the wheel assembly sides;
   a storage device that is provided on the vehicle body side and stores a correlation between pieces of information on the characteristic appearances of the wheel assembly identification indicating members mounted to the plurality of wheel assemblies respectively and the pieces of identification information held by the first communication devices;
   a second communication device that receives the pieces of wheel assembly information and identification information transmitted from the first communication devices, extracts from the received pieces of identification information the pieces of information on the characteristic appearances corresponding to the received pieces of identification information by referring to the correlation stored by the storage device, and specifies each one of the plurality of wheel assemblies from which the pieces of wheel assembly information are transmitted; and
   an informing device that informs states of the specified wheel assemblies individually based on the pieces of wheel assembly information.

2. The wheel assembly state informing system according to claim 1, wherein the informing device expresses the wheel assemblies from which the pieces of wheel assembly information are transmitted in an identifiable manner using at least one of a character, a symbol, and a color corresponding to each of the characteristic appearances extracted by the second communication device, and informs each of the states of the wheel assemblies in a manner corresponding to at least one of the character, the symbol, and the color which is expressed in an identifiable manner.

3. The wheel assembly state informing system according to claim 1, wherein:
the wheel assembly identification indicating members are respectively determined according to the first communication devices that are mounted to the wheel assemblies respectively; and
each of the wheel assembly identification indicating members is mounted to a corresponding one of the wheel assemblies to which a corresponding one of the first communication devices is mounted.

4. The wheel assembly state informing system according to claim 1, wherein the wheel assembly identification indicating members constitute the characteristic appearances by being colored at least a partial portion thereof in mutually distinguishable colors.

5. The wheel assembly state informing system according to claim 1, wherein each of the wheel assembly identification indicating members includes at least one of a wheel center cap, a valve cap and a valve washer.

6. The wheel assembly state informing system according to claim 1, wherein:
sensors connected to the first communication devices are mounted to the plurality of wheel assemblies respectively; and
the pieces of wheel assembly information are measurement data obtained by the sensors connected to the first communication devices and mounted to the wheel assemblies.

7. The wheel assembly state informing system according to claim 6, wherein the sensors include at least one group of tire internal pressure sensors mounted to the wheel assemblies and temperature sensors mounted to the wheel assemblies.

8. The wheel assembly state informing system according to claim 6, wherein:
the second communication device compares values of the measurement data with a preset allowable range for measurement data; and
the informing device informs the states of the wheel assemblies according to a result of the comparison.

9. The wheel assembly state informing system according to claim 6, wherein:
the sensors are tire internal pressure sensors mounted to the wheel assemblies;
the second communication device compares tire internal pressures measured by the tire internal pressure sensors with the allowable range; and
the informing device issues a warning when the tire internal pressures are outside the allowable range.

10. A wheel assembly informing method for informing states of a plurality of wheel assemblies individually mounted with wheel assembly identification indicating members having characteristic appearances, which are different among the wheel assemblies and make the respective wheel assemblies identifiable in external appearance, the method comprising:
transmitting by wireless transmission, from first communication devices that are respectively mounted to the plurality of wheel assemblies mounted to a vehicle body, pieces of wheel assembly information on the respective wheel assemblies as well as pieces of identification information held by the respective first communication devices, from the wheel assembly sides;
receiving the pieces of wheel assembly information and the pieces of identification information by means of a second communication device that is provided on the vehicle body side;
specifying the respective wheel assemblies from which the pieces of wheel assembly information are transmitted, by referring to a correlation between prestored pieces of information on characteristic appearances of the wheel assembly identification indicating members and the pieces of identification information and extracting the pieces of information on the characteristic appearances corresponding to the pieces of identification information received by the second communication device; and
informing the states of the specified wheel assemblies individually based on the pieces of wheel assembly information.

* * * * *